United States Patent
Kasugai et al.

[11] Patent Number: 5,203,466
[45] Date of Patent: Apr. 20, 1993

[54] FUEL CAP

[75] Inventors: Joji Kasugai; Norikazu Hosokawa, both of Aichi, Japan

[73] Assignee: Toyoda Gosei Co., Ltd., Nishikasugai, Japan

[21] Appl. No.: 903,944

[22] Filed: Jun. 26, 1992

[30] Foreign Application Priority Data

Jun. 27, 1991 [JP] Japan .................. 3-182991

[51] Int. Cl.$^5$ ............................... B65D 51/16
[52] U.S. Cl. .................. 220/209; 220/DIG. 33; 137/516.27
[58] Field of Search .......... 220/203, 204, 209, 303, 220/DIG. 33; 137/516.27, 516.29, 519

[56] References Cited

U.S. PATENT DOCUMENTS

| | | | |
|---|---|---|---|
| 1,718,350 | 6/1929 | Greenwald et al. | 137/516.27 |
| 3,075,547 | 1/1963 | Scaramucci | 137/516.29 |
| 3,091,254 | 5/1963 | Kilayko | 137/516.29 |
| 3,724,707 | 4/1973 | Burgess | 220/203 |
| 4,090,529 | 5/1978 | Schuller et al. | 137/516.29 |
| 4,588,102 | 5/1986 | Kasugai | 220/203 |
| 4,637,430 | 1/1987 | Scheffel | 137/516.29 |
| 4,666,056 | 5/1987 | Kasugai et al. | 220/203 |
| 4,724,868 | 2/1988 | Kasugai et al. | 137/516.29 |
| 4,815,705 | 3/1989 | Kasugai et al. | 251/356 |
| 5,036,888 | 8/1991 | Scharrer et al. | 138/89 |

Primary Examiner—Allan N. Shoap
Assistant Examiner—Nova Stucker
Attorney, Agent, or Firm—Cushman, Darby & Cushman

[57] ABSTRACT

A fuel cap 1 for controlling the pressure within a fuel tank which has improved sealing properties between a valve member 43 of a pressure control valve 41 and a seat surface 35. The pressure control valve 41 opens and closes a flow path hole 33 in a cap body 5 so as to control the pressure within the fuel tank. In this pressure control valve, the valve member 43 is seated on the seat surface 35 in accordance with the force of a spring 71 and the pressure within the fuel tank. The valve member has a disk portion 49 which is flexed when the valve member receives a large pressure in a valve closing direction. An outer lip 57 and an inner lip 58 are formed on the disk portion 49. The outer lip 57 is seated on the seat surface 35 when the pressure within the fuel tank reaches a predetermined pressure. When the pressure increases further, the disk portion 49 is flexed, so that the inner lip 58 is also seated on the seat surface 35. Therefore, when the pressure in the valve closing direction becomes great, the double lip portion is seated on the seat surface 35, thereby providing enhanced sealing properties.

5 Claims, 4 Drawing Sheets

FUEL CAP

FIELD OF THE INVENTION

This invention relates to a fuel cap having a pressure control valve for controlling the pressure within a fuel tank and, more particularly, to a mechanism by which the seal between a valve member of the pressure control valve and a seat surface is improved.

BACKGROUND OF THE INVENTION

A conventional fuel cap 200 is shown in FIG. 6. Cap 200 comprises a cap body 201 formed from resin which is threadedly connected to the filler hole of a fuel tank, and a pressure control valve 203 mounted on the cap body 201 so as to control the pressure within the fuel tank. More specifically, the pressure control valve 203 comprises a rubber valve member 209 adapted to be seated on a seat surface 207 around a flow path hole 205 formed in the cap body 201, and a coil spring 211 for urging the valve member 209 in a valve closing direction. In this pressure control valve 203, the valve member 209 is opened and closed in accordance with the force acting on the valve member 209 (that is, the spring force) and a pressure differential (the fuel tank negative pressure) between atmospheric pressure and the pressure within the fuel tank.

An annular lip 213 is formed on the valve member 209 of the pressure control valve 203. The lip 213 is pressed against the seat surface 207 in a line contact manner, and also is elastically deformed to be held in intimate contact therewith, thereby enhancing the resulting seal.

FIG. 7 indicates the relation between the fuel tank negative pressure P and the flow rate Q of the pressure control valve 203 for the above fuel cap 200. From the viewpoint of pressure control, it is preferred that the valve be closed to keep the flow rate Q at zero when the fuel tank negative pressure P is below a predetermined pressure Pr, whereas when the fuel tank negative pressure P exceeds the predetermined pressure Pr, the valve should be opened to cause the flow rate Q to rise vertically as indicated with a solid line. However, typically, the conventional pressure control valve 203 has characteristics such that the flow rate Q gently rises in the vicinity of the predetermined pressure Pr as indicated with a broken line. Therefore, there has been a demand for the rise characteristics to be closer to the ideal characteristics as indicated with the solid line.

In the conventional pressure control valve 203, when a valve-closing pressure higher than the predetermined pressure Pr, that is, a positive pressure, is applied, the lip 213 is seated on the seat surface 207 by the urging force of the coil spring 211, thereby ensuring the sealing effect. With this sealing construction, however, unless the dimensional accuracy of the lip 213 of the valve member 209, as well as the surface accuracy of the seat surface 207, is great, the characteristics are gentle as indicated with the broken line, which results in the problem that satisfactory sealing can not be obtained.

That problem is encountered not only with the above negative pressure type pressure control valve 203 which is opened when the fuel tank negative pressure P becomes great, but also with a pressure control valve of the positive pressure type which is opened when the pressure within a fuel tank exceeds atmospheric pressure by a predetermined amount.

SUMMARY OF THE INVENTION

The present invention seeks to overcome the above technical problem with the prior art, and an object of the invention is to provide a fuel cap provided with a pressure control valve which exhibits excellent sealing properties against a high pressure in a valve closing direction.

Thus, in accordance with the present invention, in order to solve the above problem, a fuel cap is provided which comprises a cap body adapted to be connected to filler hole of a fuel tank; and a pressure control valve mounted on the cap body so as to open and close a flow path hole formed in the cap body, thereby controlling the pressure within the fuel tank; in which the pressure control valve comprises a valve member adapted to be seated on a seat surface, provided around the flow path hole in the cap body, to close the flow path hole; and a spring which is fixed at one end thereof to the cap body, and acts at the other end thereof on the valve member via a valve member holder so as to apply an urging force to the valve member in a closing direction. The valve member has a support portion supported by the valve member holder, and a disk portion formed on an outer periphery of the support portion. The disk portion has a seat portion, and when the valve member receives a pressure in a valve closing direction, the seat portion of the disk portion is flexed in a direction opposite to the valve closing direction. An outer lip and an inner lip which are both annular and are disposed in generally concentric relation to each other are formed on the seat portion so as to be seated on the seat surface. The outer lip has a generally triangular cross-section, and is seated on the seat surface under the predetermined pressure. The inner lip has a generally triangular cross-section, and has a height less than that of the outer lip so that when the pressure in the valve closing direction becomes greater than the predetermined pressure, the inner lip can be seated on the seat surface by the flexing of the disk portion in the opposite direction.

The fuel cap of the present invention is provided with a pressure control valve for opening and closing the flow path hole, formed in the cap body, so as to control the pressure within the fuel tank. The urging force in the valve closing direction is applied to the valve member of this pressure control valve by the spring fixed to the cap body, and the pressure control valve is opened in accordance with the pressure of the fuel tank against the spring force. The valve member includes the support portion supported by the valve member holder, and the disk portion which is formed on the outer periphery of the support portion and has the seat portion. The two concentric lips adapted to be seated on the seat surface of the cap body, that is, the outer and inner lips of triangular cross-section, are formed on the seat portion.

First, the outer lip is seated on the seat surface when the pressure within the fuel tank reaches a predetermined pressure. When the pressure increases further in the valve closing direction, the disk portion of the valve member is flexed, so that the inner lip, which has a height less than that of the outer lip, is also seated on the seat surface. Therefore, when the pressure in the valve closing direction becomes higher than a predetermined pressure, the double lip portion is seated on the seat surface, thereby achieving enhanced sealing properties.

Other objects, features and characteristics of the present invention, as well as the methods of operation and functions of the related elements of he structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXEMPLARY EMBODIMENTS

In order to make the above construction and operation of the present invention more manifest, a preferred embodiment of the present invention will now be described.

Figure 1:
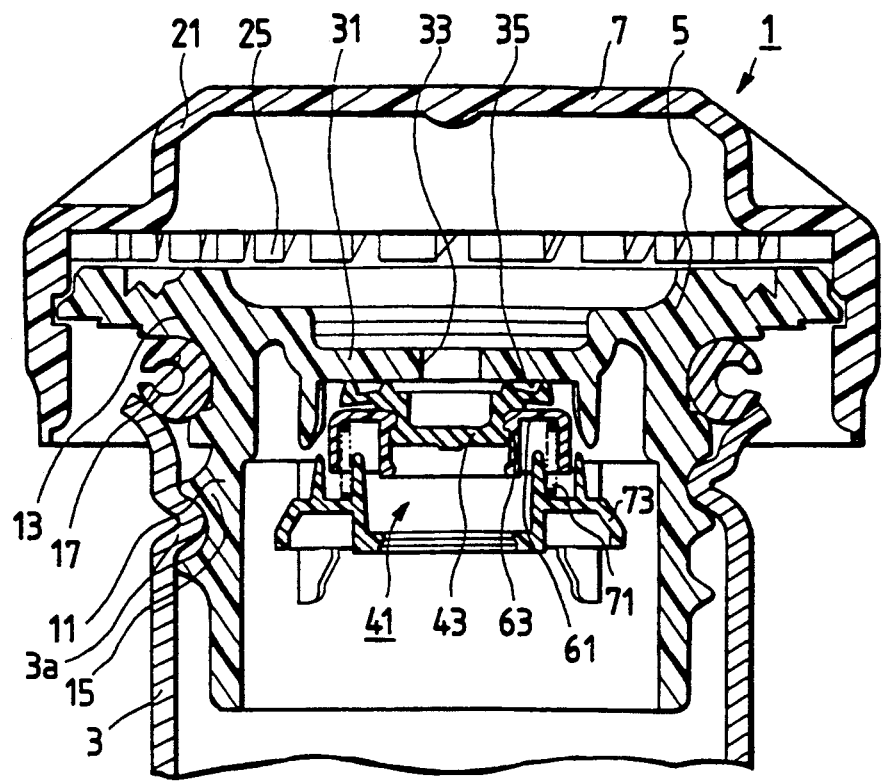
FIG. 1 is a cross-sectional view of a preferred embodiment of a fuel cap of the present invention.

Referring to FIG. 1, a fuel cap 1 is threadedly connected to a filler neck 3 having a fuel-charging filler hole of a fuel tank. The fuel cap 1 comprises a cap body 5 made of a synthetic resin, such as polyacetal, and a lid 7 which is attached to an upper portion of the cap body 5 and is made of a synthetic resin, such as nylon.

The cap body 5 includes a cylindrical wall body 11 threadedly connected to the inner periphery of the filler neck 3, and a flange 13 formed on the outer periphery of the upper portion of the wall body 11, the flange 13 serving to support the lid 7. Formed on the outer periphery of the wall body 11 is a screw 15 for threaded engagement with a screw 3a of the filler neck 3. A seal ring 17 is mounted around the wall body 11, and is disposed beneath the flange 13 at the upper end of the screw 15.

The lid 7 is attached to the flange 13, and has a grasp portion 21 at its upper end. A plurality of ratchet projections 25 engageable with a resilient pawl (not shown) on the flange 13 are formed on the reverse side of the upper end of the lid 7. When a rotational force greater than a predetermined amount is applied to the lid 7 in its closing direction, that is, when the fuel cap 1 is threadedly connected to the filler neck 3 with a torque greater than a required torque, the above resilient pawl and the ratchet projections 25 make the lid 7 idle relative to the cap body 5, thereby preventing an excessive tightening of the fuel cap 1.

A top wall 31 is formed on the inner periphery of the upper portion of the wall 11 of the cap body 5 to close the upper portion of the wall 11. A flow path hole 33 is formed through the central portion of the top wall 31. A seat surface 35 of a pressure control valve 41 of the negative pressure type is provided around the flow path hole 33.

Figure 2:
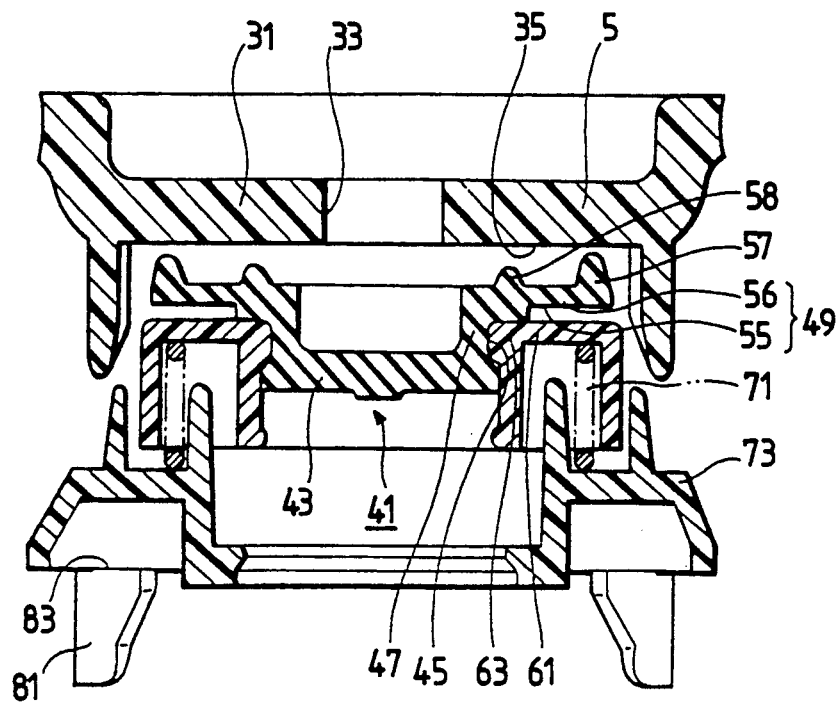
FIG. 2 is a cross-sectional view of the portion of the fuel cap which includes the pressure control valve of the invention.
Figure 3:
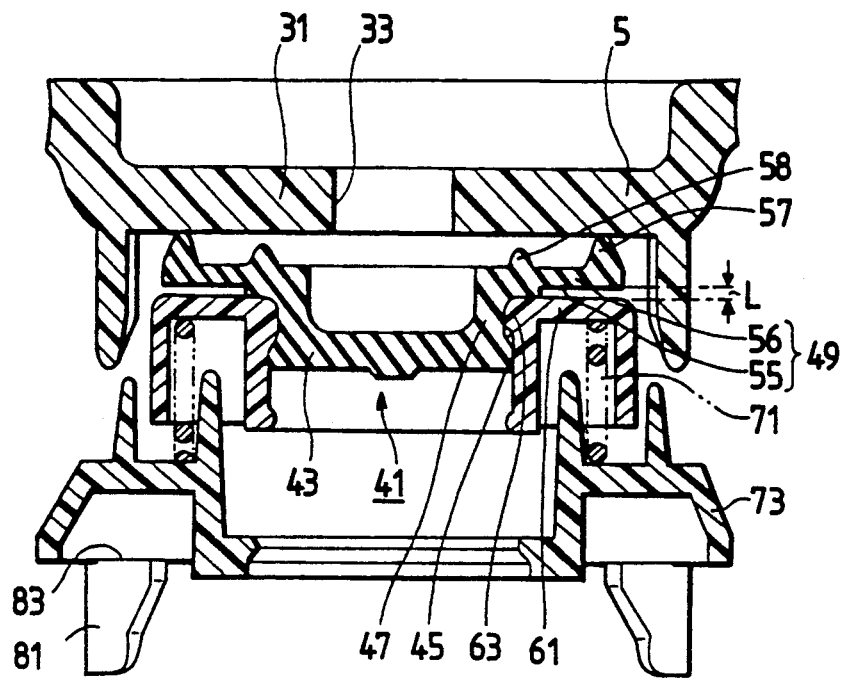
FIG. 3 is another cross-sectional view of the portion of the fuel cap which includes the pressure control valve of the invention.
Figure 4:
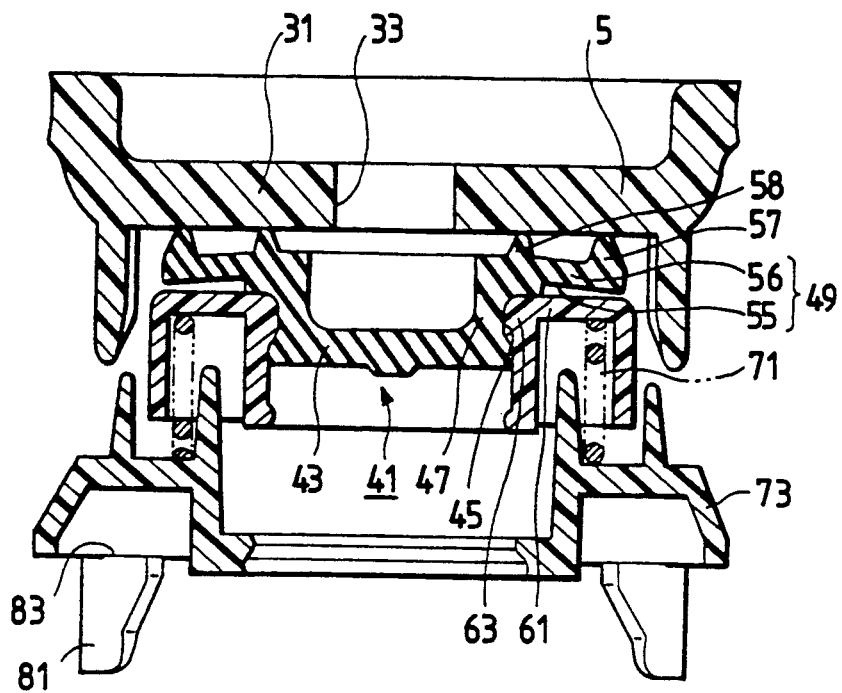
FIG. 4 is yet another cross-sectional view of the portion of the fuel ca which includes the pressure control valve of the invention.
Figure 5:
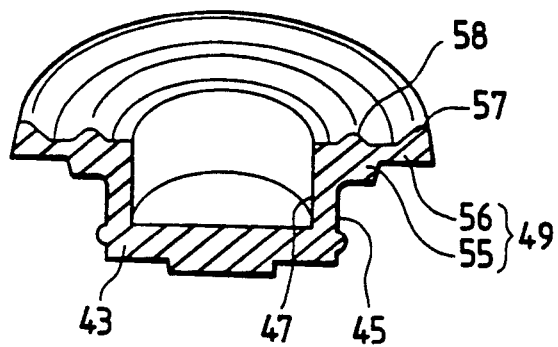
FIG. 5 is a perspective view, partly broken away, showing a seal member in accordance with the invention.
Figure 6:
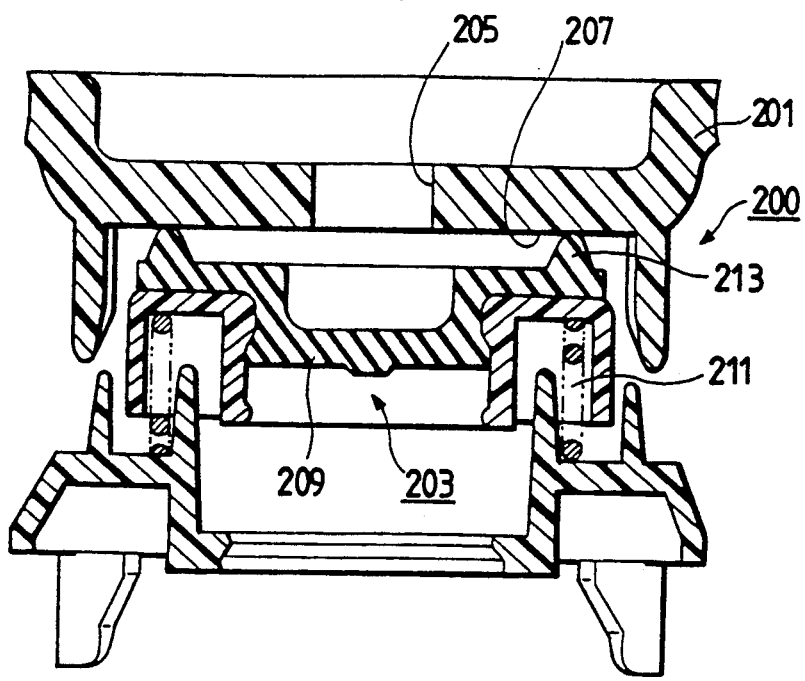
FIG. 6 is a cross-sectional view of a pressure control valve of a conventional fuel cap.

As shown in FIGS. 2 to 4, the above pressure control valve 41 has a valve member 43 of fluororubber or the like for opening and closing the flow path hole 33 in the top wall 31. The valve member 43 preferrably has a diameter of 18 mm, and includes a support portion 47, and a disk portion 49 formed on and extending from the outer periphery of the upper end of the support portion 47. The support portion 47 has a support recess 45 fitting on a fitting projection 63 formed on an inner periphery of a valve member holder 61 (see FIG. 5). The disk portion 49 has a seat portion 56 adapted to be seated on the seat surface 35, and an interconnecting portion 55 interconnecting the seat portion 56 and the support portion 47. The lower surface of the seat portion 56 is spaced a distance L (FIG. 3) from the upper surface of the outer periphery of the valve member holder 61.

The seat portion 56 has outer and inner annular lips 57 and 58 which can be seated on the seat surface 35, and are disposed in substantially concentric relation to each other.

The outer lip 57 has a substantially triangular cross-section, and is adapted to be seated on the seat surface 35 under a predetermined pressure. The inner lip 58 has a substantially triangular cross-section, and has a height less than that of the outer lip 57. In the illustrated example, the height of the outer lip 57 is 1.2 mm, and the height of the inner lip 58 is 0.6 mm. The apex of each of these lips 57 and 58 is rounded. Therefore, when the valve member 43 is exposed to a pressure higher than a predetermined pressure Pr in a positive direction, due to the engagement of the outer lip 57 with the seat surface 35, the disk portion 49 is flexed in such a direction as to decrease the distance L.

The valve member holder 61 serves to hold the valve member 43 in the above-mentioned manner, and is urged, together with the valve member 43, in the valve closing direction by a coil spring 71. The coil spring 71 is supported at its lower end by a spring retainer 73. The spring retainer 73 is retained in recesses 83 formed respectively in a plurality of (four) reinforcement ribs 81 formed on and extending radially from the inner periphery of the lower portion of the wall 11.

With the above assembly, the pressure within the fuel tank is controlled by the pressure control valve 41 in the following manner.

The fuel cap 1 is attached to the filler neck 3, and in this condition when the fuel tank negative pressure P exceeds a predetermined pressure Pr (see FIG. 7), the valve member 43 and the valve member holder 61 move downward against the bias of the coil spring 71 (FIG. 2), so that the air, flowing from the lower edge of the lid 7 through the space between the lid 7 and the flange 13, flows from the filler neck 3 into the fuel tank via the flow path hole 33. As a result, a negative pressure condition within the fuel tank is overcome. Once the negative pressure condition within the fuel tank has been overcome, the valve member 43 is urged upward by the bias of the coil spring 71 to close the valve.

On the other hand, the disk portion 49 of the valve member 43 having the interconnecting portion 55 and the seat portion 5 is seated at the outer lip portion 57 on the seat surface 35 at the predetermined pressure Pr (FIG. 3). Further, when the disk portion 49, is subjected to a pressure which acts in the valve closing direction and is higher than the predetermined pressure Pr, the disk portion 49 is flexed (FIG. 4).

Figure 7:
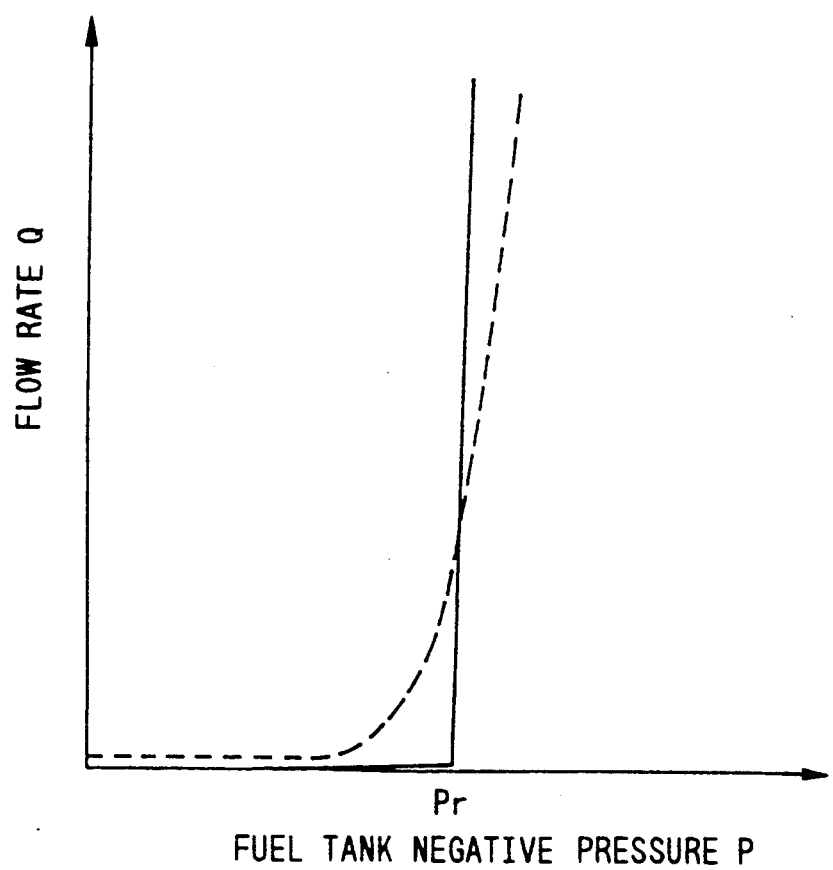
FIG. 7 is a graph showing the relation between a fuel tank negative pressure P and a flow rate Q.

As a result, the inner lip 58 is also seated on the seat surface 35. Therefore, the seal is formed by the double seal mechanism defined the outer lip 57 and the inner lip 58, and therefore the sealing properties under a pressure in a valve closing direction which is greater than predetermined pressure Pr can be improved. Therefore, the characteristics of the pressure control valve 41 can be brought close to the ideal characteristics as shown in FIG. 7 in which the flow rate is zero at the predetermined pressure.

In the above embodiment, although the pressure control valve of the negative pressure type has been described, the invention is not limited to it, and can be applied to a pressure control valve of the positive pressure type.

As described above, in the pressure control valve of the fuel cap according to the present invention, the concentric outer and inner lips adapted to be seated on the seat surface of the cap body are formed on the seat portion of the disk portion of the valve member. Therefore, at the predetermined pressure, the outer lip is seated on the seat surface to close the valve, and when the pressure increases further in the valve closing direction, the end portion of the disk portion of the valve member is flexed, so that the inner lip of a triangular cross-section will also be seated on the seat surface. Therefore, under elevated pressure in the valve closing direction, the double lip portion is seated on the seat surface, thereby improving the sealing properties.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A fuel cap comprising a cap body adapted to be connected to a filler hole of a fuel tank, said cap body having a flow path bore defined therein and a seat surface defined around said flow path bore; and a pressure control valve mounted in the cap body so as to open and close said flow path bore, said pressure control valve including:

a valve member to be seated on said seat surface around said flow path bore in the cap body, to close said flow path bore, said valve member including as support portion supported by a valve member holder and a disk portion formed on an outer periphery of said support portion, said disk portion having a seating portion which is flexible in a direction opposite to a valve closing direction when said valve member is subject to a pressure higher than a predetermined pressure;

spring means for urging said valve member via said valve member holder in said closing direction; and inner and outer annular lips which are disposed in substantially concentric relation to each other formed on said seating portion;

said outer lip having a substantially triangular cross-section and having an apex, and said inner lip having a substantially triangular cross-section, an apex, and having a height less than that of said outer lip so that when the pressure in the valve closing direction exceeds said predetermined pressure, said inner lip can be seated on said seat surface as a result of he flexing of said disk portion in said opposite direction.

2. A fuel cap as claimed in claim 1, wherein said apex of each of said inner and outer lips is rounded.

3. A fuel cap as claimed in claim 1, wherein said valve member is made of fluororubber.

4. A fuel cap as claimed in claim 1, wherein a lower surface of said disk portion corresponding to said outer lip is spaced a distance from an upper surface of said valve member holder so as to allow said disk portion to bend in a direction as to decrease said distance.

5. A fuel cap as claimed in claim 1, wherein a lower surface of said disk potion corresponding to said inner lip contacts said valve member holder so as to allow said inner lip to securely seat on said seat surface.

* * * * *